United States Patent
Taki et al.

(10) Patent No.: US 9,878,736 B2
(45) Date of Patent: Jan. 30, 2018

(54) COMMUNICATION SYSTEM

(71) Applicant: DENSO CORPORATION, Kariya, Aichi-pref. (JP)

(72) Inventors: Masaya Taki, Kariya (JP); Toshimitsu Sakai, Kariya (JP); Shuji Kuramitsu, Kariya (JP); Kouichi Nakamura, Kariya (JP); Takaharu Kozawa, Kariya (JP); Katsuhiko Hayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/178,414

(22) Filed: Jun. 9, 2016

(65) Prior Publication Data
US 2016/0362129 A1    Dec. 15, 2016

(30) Foreign Application Priority Data
Jun. 11, 2015  (JP) ................................ 2015-118349

(51) Int. Cl.
*B62D 5/04*    (2006.01)
*H04L 7/06*    (2006.01)
(Continued)

(52) U.S. Cl.
CPC ......... *B62D 5/0463* (2013.01); *B62D 5/0409* (2013.01); *G01D 21/00* (2013.01);
(Continued)

(58) Field of Classification Search
CPC ....... B62D 5/0463; B62D 5/0409; H04L 7/06; H04L 67/12
See application file for complete search history.

(56) References Cited

U.S. PATENT DOCUMENTS 4,367,414 A * 1/1983 Miller ................. H02J 13/0079
307/38
5,740,040 A * 4/1998 Kifuku ................. B62D 5/0463
180/446
(Continued)

OTHER PUBLICATIONS

Texas Instruments Multi-Channel SAE-J2716 (SENT) Decoder Using NHET by Seely, Anthony, 19 pages, Jul. 2010 available online @ http://www.ti.com/lit/an/sprab22/sprab22.pdf: last accessed on Feb. 20, 2017.*
(Continued)

*Primary Examiner* — Anne M Antonucci
(74) *Attorney, Agent, or Firm* — Knobbe, Martens, Olson & Bear, LLP

(57) ABSTRACT

A communication system includes at least one sensor apparatus including at least one sensing element and a transmission circuit, and a microcomputer including a reception circuit and a differential calculator. The sensing element detects a sensor value indicating a physical quantity of a detection target, and the transmission circuit transmits, as a digital signal, a sensor signal including information indicative of the sensor value at a predetermined transmission cycle. The reception circuit receives the sensor signal through a signal line and updates last time sensor value with present time sensor value. The differential calculator calculates, at a predetermined calculation cycle, a time differential value by performing a time differential calculation to the updated using time information provided separate from the sensor value.

15 Claims, 11 Drawing Sheets

(51) Int. Cl.
      *H04L 29/08*      (2006.01)
      *G01D 21/00*      (2006.01)
      *H04Q 9/04*      (2006.01)

(52) U.S. Cl.
      CPC ............... *H04L 7/06* (2013.01); *H04L 67/12* (2013.01); *H04Q 9/04* (2013.01)

(56) References Cited

U.S. PATENT DOCUMENTS

| | | | | |
|---|---|---|---|---|
| 2010/0114452 | A1* | 5/2010 | Bauerle | F02D 11/106 701/102 |
| 2011/0015825 | A1* | 1/2011 | Yamaura | B62D 5/0493 701/33.4 |
| 2012/0158335 | A1* | 6/2012 | Donovan | G05B 19/0423 702/79 |
| 2013/0343472 | A1* | 12/2013 | Scherr | H04L 5/1484 375/259 |
| 2015/0066301 | A1 | 3/2015 | Kozawa | |
| 2015/0067819 | A1* | 3/2015 | Shribman | H04L 67/06 726/12 |
| 2015/0077025 | A1* | 3/2015 | Suzuki | B62D 5/0463 318/400.02 |

OTHER PUBLICATIONS

SAE International, Surface Vehicle Information Report—SENT—Single Edge Nibble Transmission for Automotive Applications, SAE J2716, Jan. 2010, pp. 1-pp. 56.
U.S. Appl. No. 15/086,643, filed Mar. 31, 2016, Kozawa, et al.
U.S. Appl. No. 15/173,117, filed Jun. 3, 2016, Suzuki, et al.

* cited by examiner

FIG. 10

| TIME INFO | 1ST SENSOR VALUE | 2ND SENSOR VALUE | TIME INFO | 1ST SENSOR VALUE | 2ND SENSOR VALUE | TIME INFO | 1ST SENSOR VALUE | 2ND SENSOR VALUE |
|---|---|---|---|---|---|---|---|---|
| N-1 | S1(N-1) | S2(N-1) | N | S1(N) | S2(N) | N+1 | S1(N+1) | S2(N+1) |

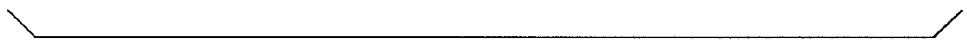

FIG. 11A

| TIME INFO | 1ST SENSOR VALUE | 2ND SENSOR VALUE |
|---|---|---|
| k | S1(k) | S2(k) |

$S_{avr}(k)$ ---------→ CALCULATE Sd

FIG. 11B

| TIME INFO | 1ST SENSOR VALUE | 2ND SENSOR VALUE |
|---|---|---|
| k1 | S1(k1) | S2(k1) |

$S_{avr}(k1)$

| TIME INFO | 1ST SENSOR VALUE | 2ND SENSOR VALUE |
|---|---|---|
| k2 | S3(k2) | S4(k2) |

$S_{avr}(k2)$ $S_{avr}(k_{1-2})$ --→ CALCULATE Sd

FIG. 11C

| TIME INFO | 1ST SENSOR VALUE | 2ND SENSOR VALUE |
|---|---|---|
| k | S1(k) | S2(k) |
|   | S3(k) | S4(k) |

$S_{avr}(k)$ --→ CALCULATE Sd

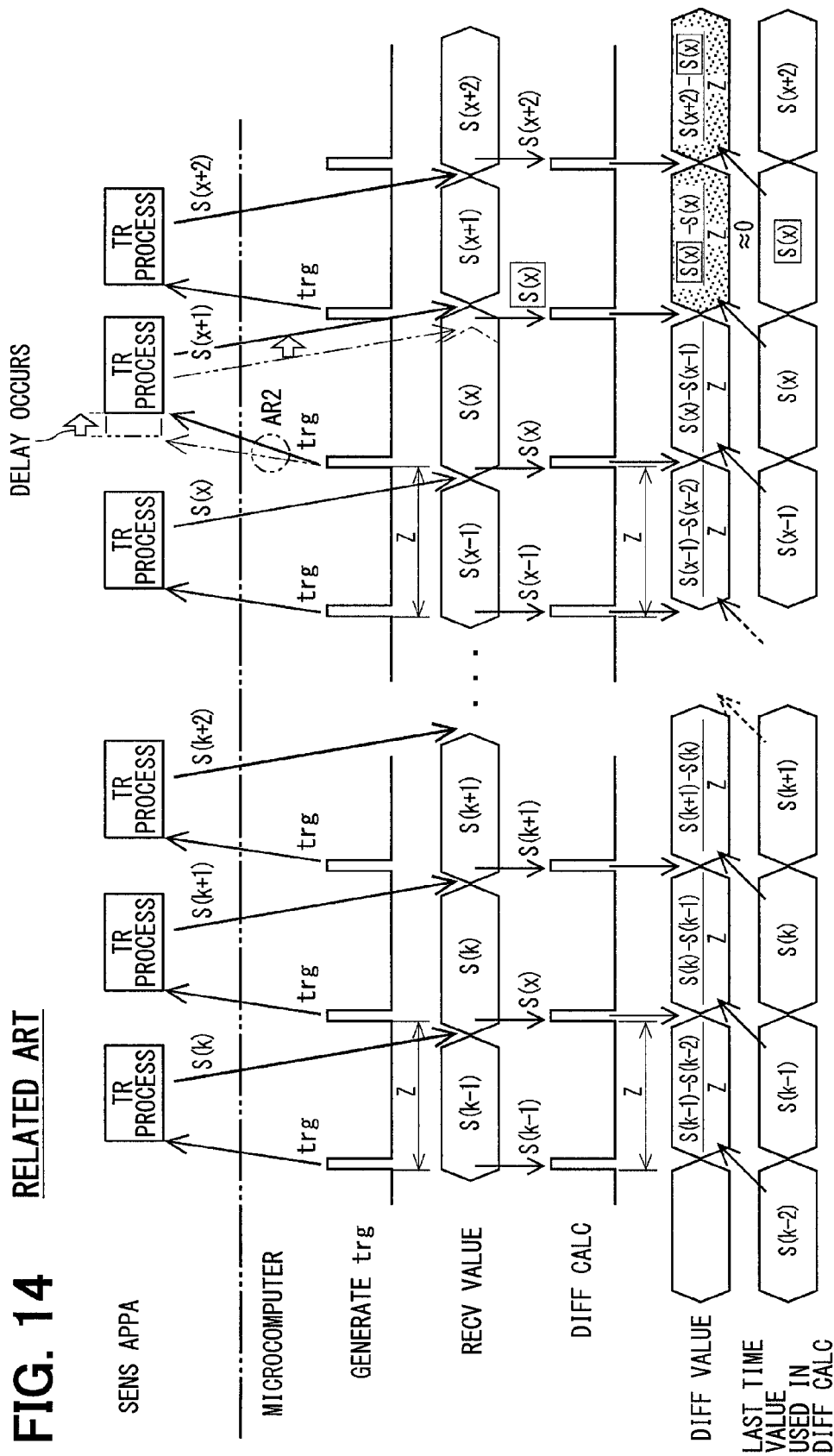

COMMUNICATION SYSTEM

CROSS REFERENCE TO RELATED APPLICATION

This application is based on Japanese Patent Application No. 2015-118349 filed on Jun. 11, 2015, the disclosure of which is incorporated herein by reference.

TECHNICAL FIELD

The present disclosure relates to a communication system in which a sensor transmits a detection signal to a control apparatus.

BACKGROUND

In a conventional communication system in which a sensor transmits a detection signal to a control apparatus, the sensor and the control apparatus are configured to operate under the common time information. For example, as disclosed in US 2013/0343472 A1, the control apparatus generates a trigger signal as a request signal, and transmits the trigger signal to the sensor. In response to the request signal, the sensor transmits the sensor signal as a response signal to the control apparatus.

In the above communication system, suppose that microcomputer included in the control apparatus receives the sensor signal transmitted from the sensor at a predetermined transmission cycle, and the microcomputer calculates a time differential value of a sensor value at a predetermined calculation cycle. In this kind of communication system, when the sensor and the microcomputer operate based on different timers, a cycle shift between the transmission cycle of the sensor and the calculation cycle of the microcomputer may be occurred even though the sensor transmits the sensor signal at a constant transmission cycle and the microcomputer performs the arithmetic calculation at a constant calculation cycle. When the cycle shift occurs, the microcomputer may fail to correctly calculate the time differential value based on the sensor value.

Regarding the cycle shift, as disclosed in US 2013/0343472 A1, the microcomputer may transmit a trigger signal to the sensor, and the sensor may transmit the sensor signal in response to the reception of the trigger signal. However, in this kind of system, a delay occurred in the transmission of the trigger signal may adversely affect a calculation of the correct differential value.

SUMMARY

In view of the foregoing difficulties, it is an object of the present disclosure to provide a communication system which enables a microcomputer to correctly calculate a time differential value of a sensor value even though a cycle shift exists between a transmission cycle of a sensor apparatus and a calculation cycle of the microcomputer or a transmission delay occurs to a synchronization trigger signal.

According to an aspect of the present disclosure, a communication system includes at least one sensor apparatus and a microcomputer. The at least one sensor apparatus includes at least one sensing element and a transmission circuit. The at least one sensing element detects a sensor value indicating a physical quantity of a detection target. The transmission circuit transmits, as a digital signal, a sensor signal including information indicative of the sensor value at a predetermined transmission cycle. The microcomputer includes a reception circuit and a differential calculator. The reception circuit receives the sensor signal transmitted from the transmission circuit of the at least one sensor apparatus through a signal line and updates the sensor value received at last time with the sensor value received at present time. The differential calculator calculates, at a predetermined calculation cycle, a time differential value by performing a time differential calculation to the sensor value that is updated using time information provided separate from the sensor value.

In the above communication system, the microcomputer calculates the time differential value using the time information provided separate from the sensor value. With this configuration, the microcomputer can correctly calculate the time differential value of the sensor value even though cycle shift exists between the transmission cycle of the sensor apparatus and the calculation cycle of the microcomputer or a transmission delay occurs to the synchronization trigger signal.

BRIEF DESCRIPTION OF THE DRAWINGS

The above and other objects, features and advantages of the present disclosure will become more apparent from the following detailed description made with reference to the accompanying drawings. In the drawings:

FIG. 10 is a diagram showing a general format of a combination of sensor value and time information in the communication system according to third and fourth embodiments;

FIG. 11A is a diagram showing a specific example of a combination of sensor value and time information according to the third embodiment;

FIG. 11B is a diagram showing a specific example of a combination of sensor value and time information according to the fourth embodiment;

FIG. 11C is a diagram showing a specific example of a combination of sensor value and time information according to the fourth embodiment;

FIG. 14 is a time chart showing a calculation of a differential value according to a related art.

DETAILED DESCRIPTION

The following will describe a communication system according to embodiments of the present disclosure with reference to the accompanying drawings. In the present embodiment, the same reference number or symbol is added to the same or equivalent parts, and a description of the similar part will be omitted. In the present disclosure, the term "present embodiment" is used to describe each of first to fourth embodiments.

(First Embodiment)

The following will describe a communication system according to the first embodiment of the present disclosure with reference to FIG. 1A to FIG. 8. The communication system according to the present embodiment is applied to, for example, an electric power steering apparatus equipped to a vehicle.

Figure 2:
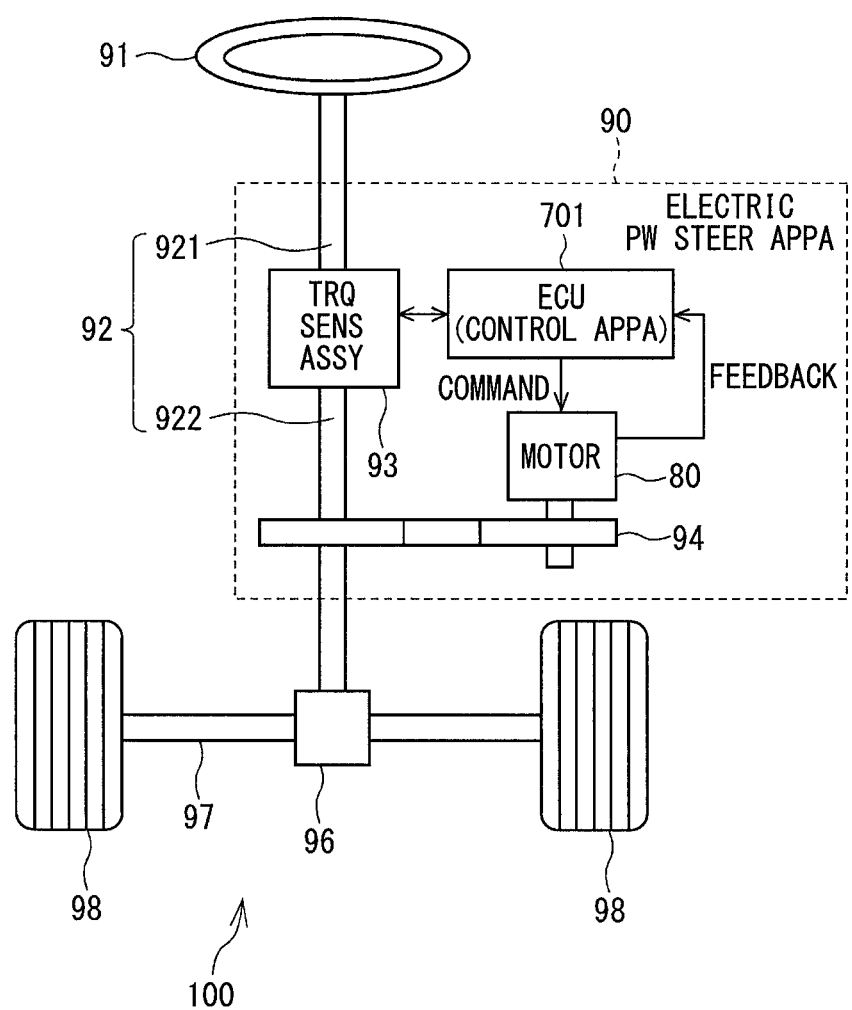
FIG. 2 is diagram showing a configuration of an electric power steering apparatus to which the communication system according to the present disclosure is applied.

FIG. 2 shows a configuration of a steering system 100 including the electric power steering apparatus 90. The electric power steering apparatus 90 shown in FIG. 2 is a column assisted electric power steering apparatus. Alternatively, the communication system may also be applied to a rack assisted electric power steering apparatus.

The steering system 100 includes a steering wheel 91, a steering shaft 92, a pinion gear 96, a rack shaft 97, wheels 98, and the electric power steering apparatus 90.

The steering shaft 92 is connected to the steering wheel 91. The pinion gear 96 disposed at an end of the steering shaft 92 is engaged with the rack shaft 97. A pair of wheels 98 is disposed at both ends of the rack shaft 97 through, for example, tie rods. When a driver rotates the steering wheel 91, the steering shaft 92 connected to the steering wheel 91 starts to rotate. The rotation motion of the steering shaft 92 is converted to a linear motion of the rack shaft 97 by the pinion gear 96, and a pair of the wheels is steered by an angle corresponding to a displacement amount of the rack shaft 97.

The electric power steering apparatus (ELECTRIC PW STEER APPA) 90 includes a torque sensor assembly (TRQ SENS ASSY) 93, an electronic control unit (ECU) 701, a motor 80, and a speed reduction gear 94. The ECU 701 functions as a control apparatus (CONTROL APPA).

The torque sensor assembly 93 is disposed at a portion between two ends of the steering shaft, and detects a steering torque. Specifically, the torque sensor assembly 93 detects the steering torque based on a twist angle of an input axis 921 disposed on the steering wheel side and a twist angle of an output axis 922 disposed on the pinion gear side. The ECU 701 calculates a torque command indicating an assist torque to be outputted by the motor 80 based on the steering torque acquired from the torque sensor assembly 93. Then, the ECU 701 controls a power supply to the motor 80 so that the motor 80 outputs the torque required by the torque command. The assist torque generated by the motor 80 is transferred to the steering shaft 92 through the speed reduction gear 94.

For example, the ECU 71 controls a power supply to the motor 80 by performing a feedback control to a current supplied to the motor 80 and a torque outputted from the motor 80. The control process performed by the ECU 701 may be achieved by a software process or a hardware process. When the control process is achieved by the software process, a central processing unit (CPU) of the microcomputer 711 executes a preliminarily stored program to perform the control process. When the control process is achieved by the hardware process, a special purpose electric circuit may be provided to perform the control process. The ECU 701 may be integrated with the motor 80 as one body.

Figure 1A:
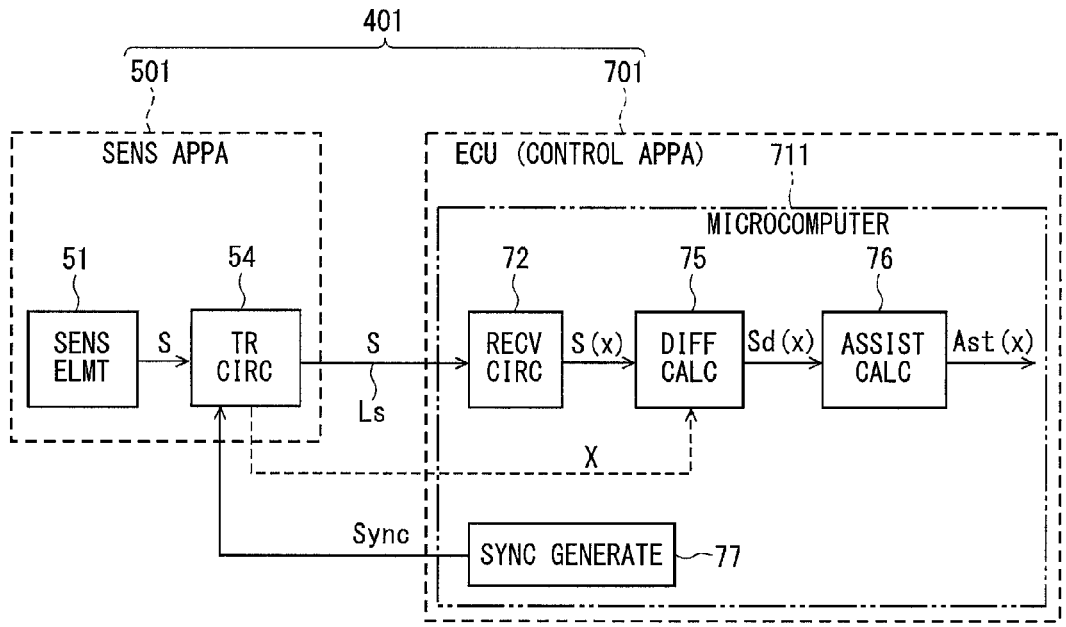
FIG. 1A is a block diagram showing a configuration of a communication system and assignment of time information at transmission end according to first and second embodiments of the present disclosure.
Figure 1B:
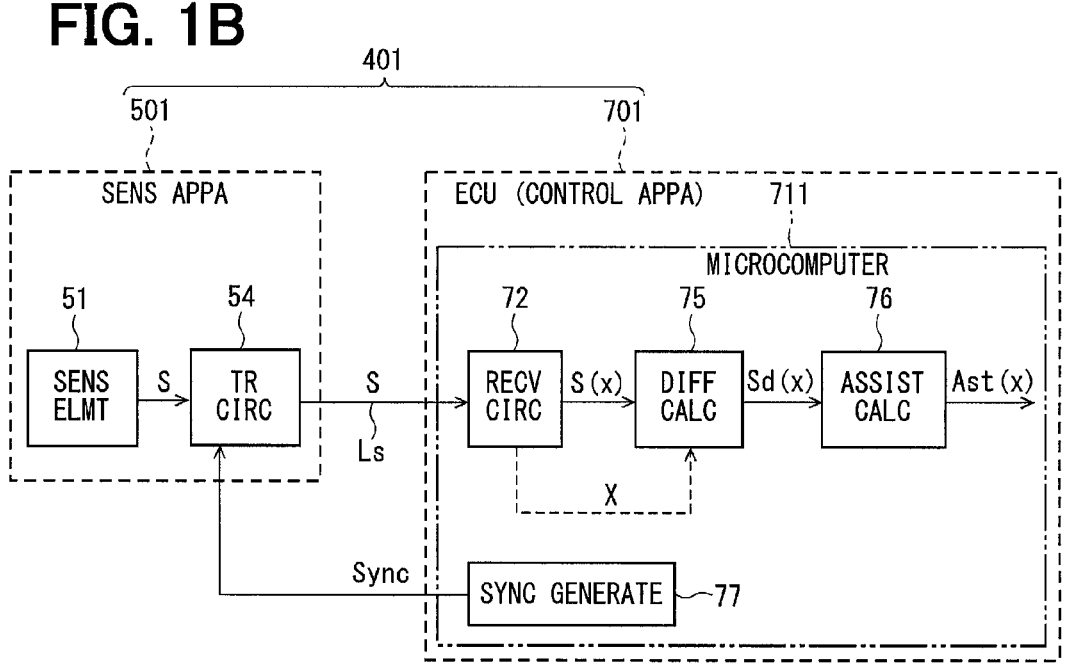
FIG. 1B is a block diagram showing a configuration of a communication system and assignment of time information at reception end according to the first and second embodiments of the present disclosure.

The following will describe a configuration of the communication system according to the first and second embodiments of the present disclosure with reference to FIG. 1A and FIG. 1B. In the first and second embodiments, specific contents of the time information (TIME INFO) X are different from one another, but a configuration of the communication system 401 is similar to one another. Regarding an assignment of the time information, each of the first and second embodiments adopts the configuration shown in FIG. 1A or the configuration shown in FIG. 1B.

The communication system 401 includes a sensor apparatus (SENS APPA) 501 and a microcomputer 711. The sensor apparatus 501 detects twist angles in the torque sensor assembly 93 and transmits a sensor signal S to the microcomputer 711. The microcomputer 711 receives the sensor signal S from the sensor apparatus 501. The microcomputer 711 is included in ECU 701 and performs a main calculation operation. In the description of the present embodiment, detailed description of a specific configuration of the ECU 701 except the microcomputer 711 will be omitted. The sensor apparatus 501 is connected with the microcomputer 711 of the ECU 701 through a signal line Ls.

The sensor apparatus 501 includes a sensing element (SENS ELMT) 51 and a transmission circuit (TR CIRC) 54. The sensing element 51 detects a sensor value indicating a physical quantity of a detection target. The transmission circuit 54 transmits, as a digital signal, the sensor signal S including information indicating the sensor value at a constant transmission cycle. Hereinafter, the terms "sensor value" and the "sensor signal" are properly used according to the situations. The sensor value is a specific value included in the sensor signal. In the drawings, a symbol "S" indicates both the sensor value and the sensor signal.

In an actual use, the sensor apparatus 501 needs a power source to supply power to the sensing element 51 and the transmission circuit 54, and also needs a reference voltage generation unit. For simplification, the power source and the reference voltage generation unit are not shown in the drawing and description is also omitted. For example, the sensor apparatus 501 may be supplied with power by a power supplying circuit (not shown) included in the ECU 701. In this case, the sensor apparatus 501 is connected with the ECU 701 through a power supply line and a reference voltage line, in addition to the signal line Ls. That is, the sensor apparatus 501 is connected with the ECU 701 through three lines.

For example, when a hall element for detecting a magnetic field is used as the sensing element 51, a hall IC formed as a package including the hall element corresponds to the sensor apparatus 501. In addition to the sensor apparatus 501, the torque sensor assembly 93 further includes a torsion bar, a multipolar magnet, a magnetic yoke, a magnetism collecting ring and the like. Since a configuration of the torque sensor assembly 93 is well known, a drawing of the torque sensor assembly 93 is not shown.

When the sensing element 51 is provided by the hall element, the sensing element 51 detects a magnetism displacement of the magnetism collecting ring corresponding to the twist displacement of the torsion bar, converts the detected magnetism displacement to a voltage signal, and outputs the converted voltage signal. In this example, the magnetism collecting ring corresponds to a detection target. The twist displacement or a steering torque correlated to the twist displacement corresponds to detection information of the detection target.

The transmission circuit 54 shown in FIG. 1A and FIG. 1B has a sampling and holding function, analog to digital converting function, a memory function, and a timer function. The transmission circuit 54 samples and holds an analog voltage signal outputted from the sensing element 51 for a predetermined number of cycles, and performs an analog to digital conversion to the analog signal. Then, the transmission circuit 54 transmits the sensor signal, which is obtained by performing the analog to digital conversion, to the microcomputer 711 at a predetermined transmission cycle.

In the present embodiment, the sensor signal adopts a nibble signal defined under SAE-J2716 which is a standard established by Society of Automotive Engineers International. The nibble signal is a signal defined under a Single Edge Nibble Transmission (SENT) protocol.

In SENT protocol, a bidirectional communication is enabled using a nibble signal having four bit width as disclosed in JP 2015-46770. As an example of the sensor signal defined under the SENT protocol, data outputted from the main sensor and data outputted from the subsidiary sensor may be transmitted as a single signal frame as shown in FIG. 3.

Figure 3:
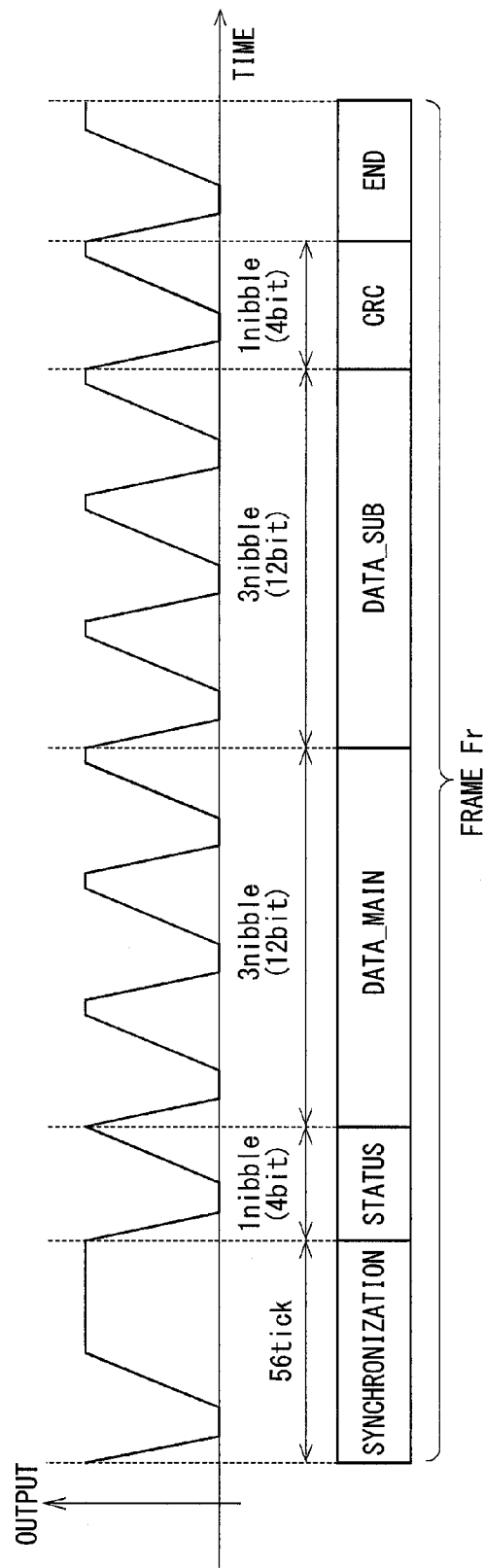
FIG. 3 is a diagram showing an example of a sensor signal utilized in a single edge nibble transmission (SENT) communication.

The sensor signal shown in FIG. 3 corresponds to one frame, and includes a synchronization field, a status field, a main data field, subsidiary data field, a cyclic redundancy check (CRC) field, and an end field. The data stored in the multiple fields of the sensor signal are outputted in the described order.

For example, a length of the synchronization field is 56 ticks. Herein, one tick is defined as 1.5 microsecond. For example, a size of the status field may be one nibble (4 bits), a size of the main data field may be three nibbles (12 bits), a size of the subsidiary data field may be three nibbles (12 bits), and a size of the CRC field may be one nibble (4 bits). When the size of the data signal is three nibbles, twelfth power of two ($2^{12}$=4096) kinds of data values can be transmitted using the three nibble signal.

In the present embodiment, the transmission cycle of the sensor signal from the transmission circuit 54 is basically set equal to a calculation cycle of a differential calculator 75 included in the microcomputer 711. The sensor apparatus 501 and the microcomputer 711 operate using different timers from one another. Thus, a cycle shift may be generated between the transmission cycle of the sensor apparatus 501 and the calculation cycle of the microcomputer 711.

In the present embodiment, the microcomputer 711 outputs a synchronization signal Sync to the sensor apparatus 501. The synchronization signal is a signal that is synchronized with the calculation cycle of the differential calculator 75. The transmission circuit 54 transmits the sensor signal at a time point corresponding to the synchronization signal Sync. Further, the synchronization signal Sync may be transmitted at a predetermined time interval which is set equal to a predetermined number times of the calculation cycle. As another example, asynchronous communication may be carried out without using the synchronization signal.

The microcomputer 711 of the ECU 701 includes a reception circuit (RECV CIRC) 72, the differential calculator (DIFF CALC) 75, an assist amount calculator (ASSIST CALC) 76, and a synchronization signal generation unit (SYNC GENERATE) 77. The reception circuit 72 receives the sensor signal transmitted from the transmission circuit 54 through the signal line Ls, and updates the sensor value S received at last time with the latest value. Further, the reception circuit 72 holds the updated sensor value S until next reception.

The differential calculator 75 performs a time differential calculation to the sensor value and obtains a time differential value Sd. Then, the differential calculator 75 uses the time differential value Sd to perform a calculation at a predetermined calculation cycle using time information assigned separate from the sensor value. The sensor value is a function of time, and is represented as sensor value S(x). The time differential value is also a function of time, and is represented as time differential value Sd(x). Herein, x is a parameter indicating the time information X acquired at present time. Thus, the last time sensor value is represented as sensor value S(x−1), and the next time sensor value is represented as sensor value S(x+1).

The time information X may be assigned as shown in FIG. 1A or FIG. 1B. In the configuration shown in FIG. 1A, when the transmission circuit 54 of the sensor apparatus 501 transmits the sensor signal to the microcomputer 711, the sensor apparatus 501 assigns the time information X separate from the sensor value S. Herein, the time information X may be transmitted together with the sensor value S. In the configuration shown in FIG. 1B, when the reception circuit 72 of the microcomputer 72 receives the sensor signal, the reception circuit 72 updates the sensor value S. Then, a time at which the sensor value is updated may be assigned as the time information X. In the configuration shown in FIG. 1B, a size of data transmitted from the sensor apparatus 501 to the microcomputer 711 may be reduced compared with the configuration shown in FIG. 1A.

In the present embodiment, the communication system 401 is applied to the electric power steering apparatus 90, and the sensor value S indicates a steering torque. Positivity and negativity of the sensor value S is defined corresponding to a rotation direction of the steering wheel 91. The time differential value Sd corresponds to a changing rate of the steering torque with respect to time. When a driver operates the steering wheel 91 at a sharp angle within a short time, an absolute value of the time differential value Sd may be increased. When the driver slowly operates the steering wheel 91, the absolute value of the time differential value Sd may be decreased.

The microcomputer 711 of the ECU 701 controls the assist torque required to be outputted by the motor 80 corresponding to a steering characteristic of the driver. Thus, the assist amount calculator 76 calculates an assist amount Ast(x) based on the time differential value Sd(x) calculated by the differential calculator 75. The microcomputer 711 controls, based on the assist amount (corresponding to torque command), an electric power to be applied to a coil of the motor 80. This power supply to the motor 80 is carried out by a well-known method, for example, controlling switching operations of an inverter in current feedback manner. As a result, the motor 80 can output a required torque to assist the steering operation of the driver.

The synchronization signal generation unit 77 of the microcomputer 711 generates a synchronization signal Sync that is synchronized with the calculation cycle of the differential calculator 75, and outputs the generated synchronization signal Sync to the sensor apparatus 501. The synchronization signal Sync may be transmitted in bidirectional manner using the signal line Ls, which transmits the sensor signal S. As another example, the synchronization signal Sync may be transmitted to the sensor apparatus 501 using a special purpose communication line. In an embodiment adopting the asynchronous communication, the microcomputer 711 has no need to include the synchronization signal generation unit 77.

Figure 13:
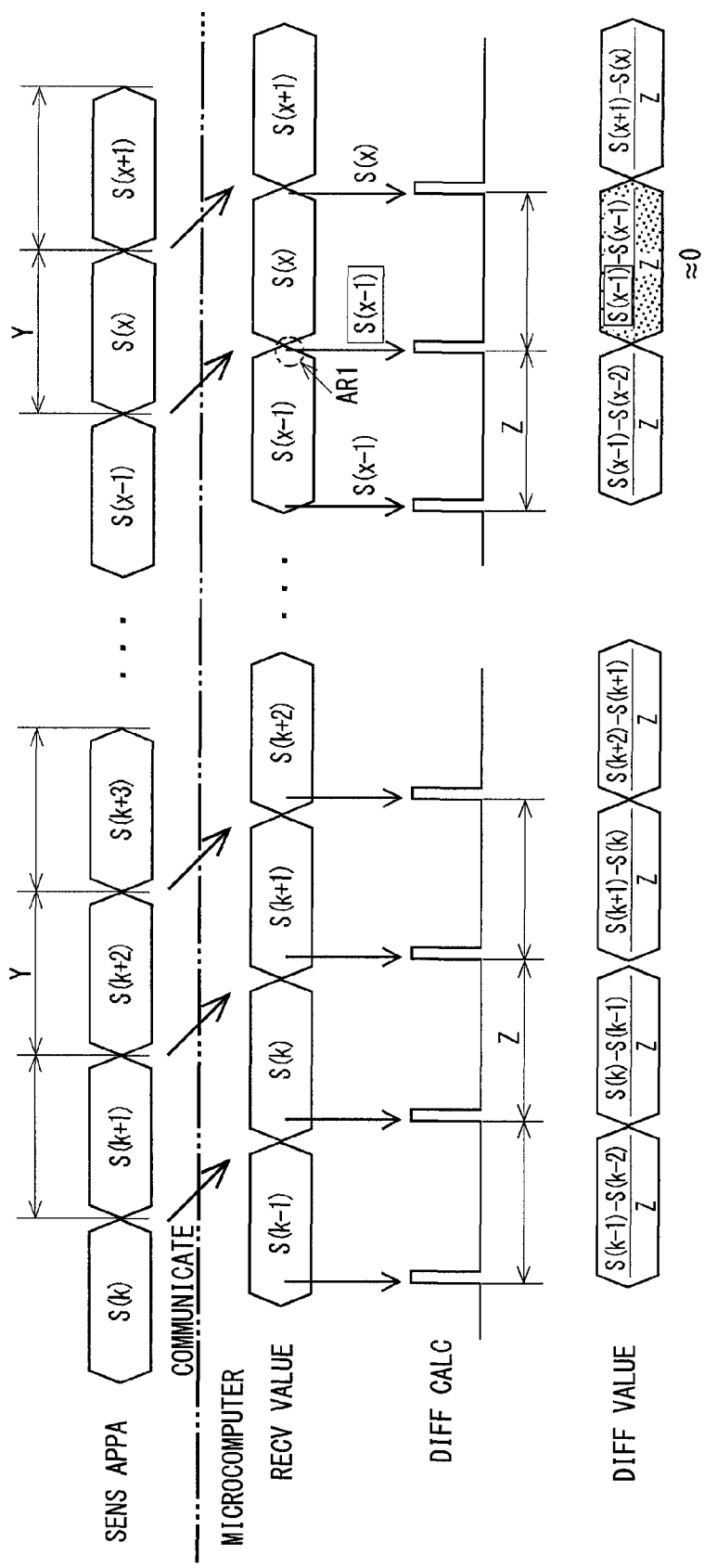
FIG. 13 is a time chart showing a calculation of a differential value according to a related art.

The following will describe a conventional communication system according to a related art with reference to FIG. 13 and FIG. 14. In the conventional communication system, suppose that the microcomputer performs a differential calculation to the sensor value. The conventional communication does not have a concept of assigning the time information separate from the sensor value. In FIG. 13 and FIG. 14, noteworthy sensor values are shown by squares, and the time differential values that are not correctly calculated are shown by dotted pattern.

The time chart in FIG. 13 shows a transmission cycle Y of the sensor signal transmitted by the sensor apparatus, a reception cycle of the reception sensor value (RECV VALUE) by the microcomputer, a calculation cycle Z of differential calculation (DIFF CALC), and a time differential value (DIFF VALUE) in up to down direction. The transmission cycle Y has a constant value, and the differential calculation cycle Z also has a constant value. In most of cases, the transmission cycle Y is set equal to the differential calculation cycle Z. When the sensor apparatus and the microcomputer operate based on different timers, the transmission cycle Y may be shifted from the calculation cycle Z caused by variation in different timers. Suppose a case where the transmission cycle Y becomes longer than the calculation cycle Z caused by the timer variation.

As shown on left side on a drawing sheet of FIG. 13, there is no cycle shift and each reception value S(k−1), S(k), S(k+1) . . . corresponds to successive differential calculation time points one-to-one basis. The time differential value is calculated by dividing a difference between the present reception value and the last time reception value by the calculation cycle Z. However, the cycle shift gradually increases over time. As shown by an arrow AR1 in FIG. 13, a time at which the microcomputer is supposed to receive the reception value S(x) has a delay with respect to the differential calculation time, and the differential calculation is carried out using the last time reception value S(x−1).

In this case, a calculation result of the time differential value using the following formula 1 becomes approximately equal to zero, and the microcomputer fails to correctly calculate the time differential value.

$$\{S(x-1)-S(x-1)\}/Z \approx 0 \qquad (1)$$

Further, as disclosed in US 2013/0343472 A1, a configuration in which the microcomputer transmits a synchronization trigger signal to the sensor apparatus is shown in FIG. 14. As shown on left side on a drawing sheet of FIG. 14, the synchronization trigger signal trg is transmitted from the microcomputer to the sensor apparatus without delay in each cycle. When receiving the synchronization trigger signal trg, the sensor apparatus performs a transmission process (TR PROCESS), and transmits, to the microcomputer, the sensor signals S(k), S(k+a), S(k+2) . . . at a predetermined transmission cycle. The time differential value is calculated by dividing a difference between the present reception value and the last time reception value by the calculation cycle Z.

As shown by an arrow AR2 in FIG. 14, a trigger signal trg which is supposed to be outputted synchronized with a differential calculation cycle of the sensor signal S(x) is delayed from a time shown by a two-dot chain line to a time shown by a solid line. By this transmission delay of the trigger signal, the transmission process of the sensor signal S(x+1) in the sensor apparatus is delayed, and accordingly, the reception time of the sensor signal S(x+1) by the microcomputer is delayed. Due to the delayed reception of the signal S(x+1), the signal S(x+1) cannot be used in the next differential calculation. In this case, as shown in FIG. 14, the present time sensor signal S(x) is received again by the microcomputer. Under this situation, the signal value S(x) replaces the position where the signal value S(x+1) should be used in the following differential calculation formula 2.1. In this case, a result of the following formula 2.1 becomes approximately equal to zero, and the microcomputer fails to correctly calculate the time differential value.

$$\{S(x)-S(x)\}/Z \approx 0 \qquad (2.1)$$

When the next synchronization trigger signal is transmitted without delay, the sensor signal S(x+2) is properly received. In this case, in the following differential calculation formula 2.2, the signal value S(x) replaces the position where the last time signal value S(x+1) should be used in the following differential calculation formula 2.2. Thus, the microcomputer fails to correctly calculate the time differential value.

$$\{S(x+2)-S(x)\}/Z \qquad (2.2)$$

Regarding the above-described incorrect calculation result of the time differential value in the conventional communication system, the communication system 401 according to the present embodiment enables the microcomputer 711 to correctly calculate the time differential value of the sensor value regardless of the cycle shift between the transmission cycle Ttr of the sensor apparatus 501 and the calculation cycle Top of the microcomputer 711 or the transmission delay of the synchronization trigger signal trg. The differential calculator 75 corrects the sensor value using the time information which is provided separate from the sensor value, and calculates the time differential value using the corrected sensor value.

Figure 4A:
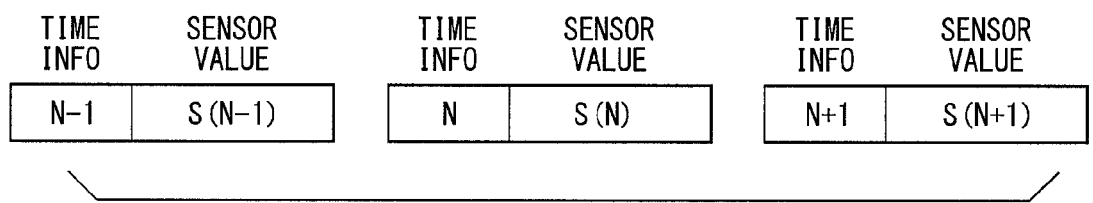
FIG. 4A is a diagram showing a combination of sensor value and time information provided by a communication counter in the communication system according to the first embodiment.
Figure 4B:
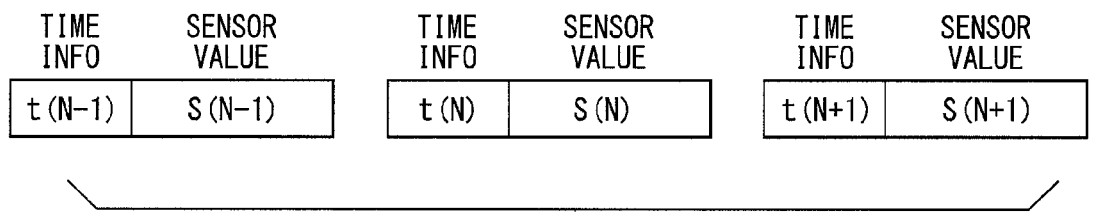
FIG. 4B is a diagram showing a combination of sensor value and time information provided by time stamp in the communication system according to the second embodiment.

Each of FIG. 4A and FIG. 4B shows a general combination of the sensor value and the time information (TIME INFO). FIG. 4A shows the combination of the sensor value and the time information according to the first embodiment. As shown in FIG. 4A, in the first embodiment, a communication counter indicating a counting value of the sensor value updates is used as the time information. In FIG. 4A, the time information provided by the communication counter is expressed as (N−1), N, (N+1). FIG. 4B shows the combination of the sensor value and the time information according to the first embodiment. As shown in FIG. 4B, in the second embodiment, a time stamp indicating a communication execution time is used as the time information. In FIG. 4B, the time information provided by the time stamp is expressed as t(N−1), t(N), t(N+1).

Figure 5:
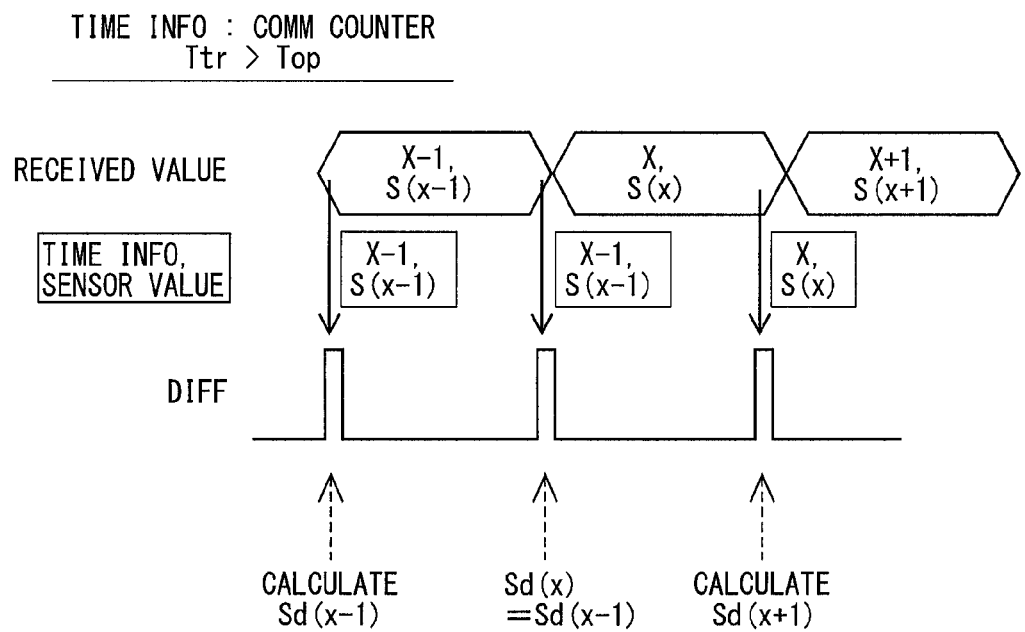
FIG. 5 is a time chart showing a calculation of a time differential value of a sensor value when a transmission cycle is longer than a calculation cycle in the communication system according to the first embodiment.
Figure 6:
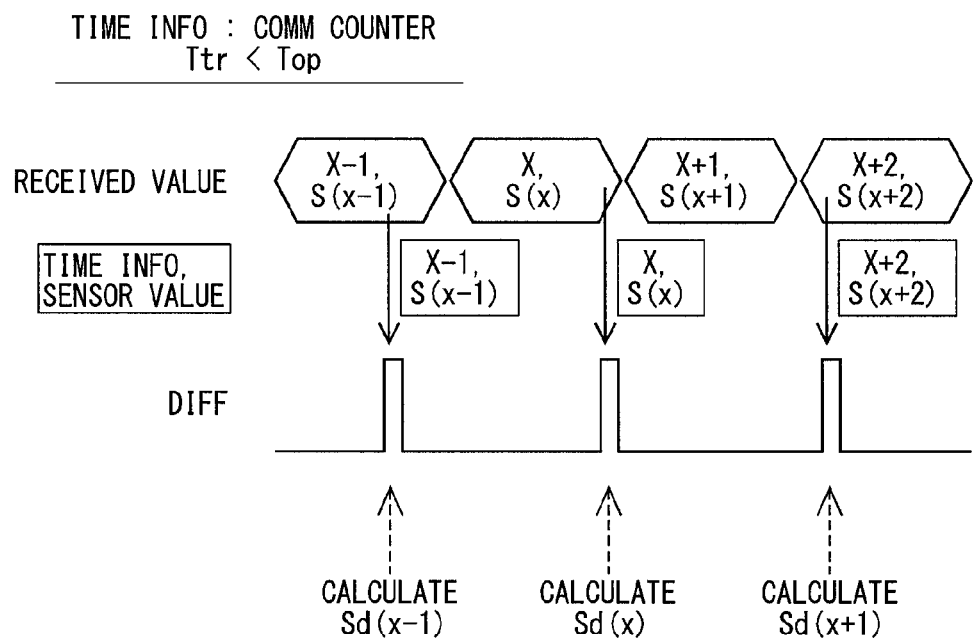
FIG. 6 is a time chart showing a calculation of a time differential value of a sensor value when a transmission cycle is shorter than a calculation cycle in the communication system according to the first embodiment.

The following will describe a differential calculation according to the first embodiment in which the communication counter (COMM COUNTER) is provided as the time information with reference to FIG. 5 and FIG. 6. As shown in FIG. 5, suppose that a cycle shift occurs and this cycle shift causes the transmission cycle Ttr becomes longer than the calculation cycle Top. In this case, the received sensor value S(x−1) assigned with the counter value (X−1) is repeatedly used by twice in the differential calculation (DIFF). The differential calculator 75 calculates the respective time differential values Sd(x−1) and Sd(x+1) using the following formula 3.1 and the formula 3.3. As described above, the time differential value is calculated by dividing a difference between the last time and the present time sensor values by the difference calculation cycle Td. When the sensor apparatus 501 provides the communication counter, the difference calculation cycle Td is set to be equal to a target value of the transmission cycle Ttr. When the microcomputer 711 provides the communication counter, the difference calculation cycle Td is set to be equal to a target value of the calculation cycle Top.

When the time differential value Sd(x) is defined as the present time value, the last time information (X−1) used in the calculation of the present time differential value is not updated. That is, the present calculation is carried out before updating of the time information. At this time, as shown in the following formula 3.2, the last time differential value Sd(x−1) is assigned to the present time differential value Sd(x). With this configuration, the time differential value Sd can be correctly calculated.

$$Sd(x-1)=\{S(x-1)-S(x-2)\}/Td \tag{3.1}$$

$$Sd(x)=Sd(x-1) \tag{3.2}$$

$$Sd(x+1)=\{S(x)-S(x-1)\}/d \tag{3.3}$$

As shown in FIG. 6, suppose that a cycle shift occurs and this cycle shift causes the transmission cycle Ttr becomes shorter than the calculation cycle Top. In this case, the received sensor value S(x+1) assigned with the counter value (X+1) is skipped and is not used in the differential calculation (DIFF CALC). The differential calculator 75 calculates the respective time differential values Sd(x−1), Sd(x), and Sd(x+1) using the following formula 4.1, formula 4.2, formula 4.3a, and formula 4.3b. As described above, the time differential value is calculated by dividing a difference between the last and the present time sensor values by the difference calculation cycle Td.

$$Sd(x-1)=\{S(x-1)-S(x-2)\}/Td \tag{4.1}$$

$$Sd(x)=\{S(x)-S(x-1)\}/Td \tag{4.2}$$

$$Sd(x+1)=\{S(x+2)-S(x)\}/(2\times Td) \tag{4.3a}$$

The following formula 4.3b may be used instead of formula 4.3a.

$$Sd(x+1)=\{S(x+2)-S(x+1)\}/Td \tag{4.3b}$$

As described above, in the communication system 401 according to the first embodiment, the differential calculator 75 of the microcomputer 711 calculates the time differential value using the time information assigned separate from the sensor value.

With this configuration, the shift between the transmission cycle and the calculation cycle can be determined with reference to the difference of the time information. Further, in a case where the cycle shift is occurred, the differential calculator 75 corrects the sensor value to be used in the differential calculation. Thus, the time differential value can be correctly calculated. When this communication system 401 is applied to the electric power steering apparatus, the changing rate of the operation torque with respect to time can be correctly calculated. This enables an improved control to the motor 80 to correctly output the required assist torque. This improves a driver's steering experience of the steering operation.

(Second Embodiment)

As described above, the communication system 401 according to the second embodiment has a configuration similar to the communication system 401 according to the first embodiment. In the second embodiment, time stamp is used as the time information in the differential calculation of the sensor value.

Figure 7:
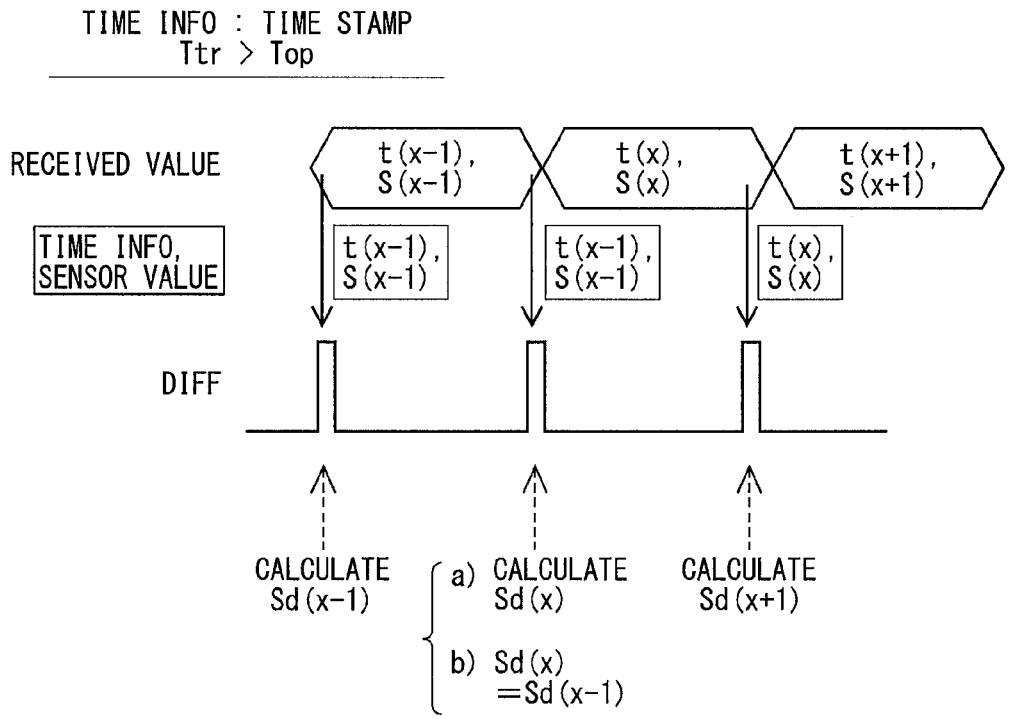
FIG. 7 is a time chart showing a calculation of a time differential value of a sensor value when a transmission cycle is longer than a calculation cycle in the communication system according to the second embodiment.
Figure 8:
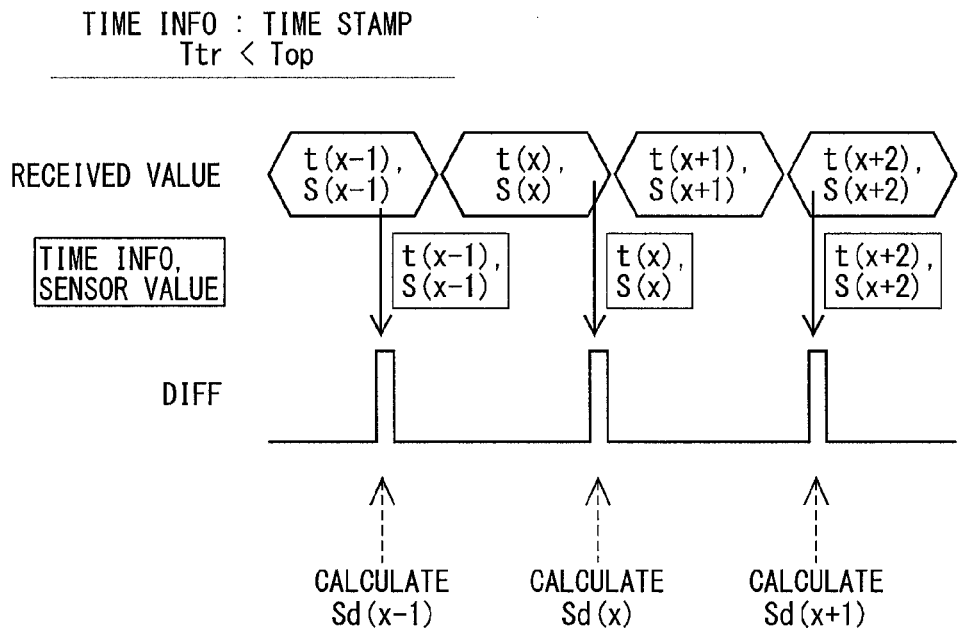
FIG. 8 is a time chart showing a calculation of a time differential value of a sensor value when a transmission cycle is shorter than a calculation cycle in the communication system according to the second embodiment.

The following will describe the differential calculation according to the second embodiment in which the time stamp is used as the time information with reference to FIG. 7 and FIG. 8. The time stamp used in the differential calculation may be provided by a transmission time stamp assigned when the transmission circuit 54 transmits the sensor signal. Alternatively, the time stamp may be provided by a reception time stamp assigned when the reception circuit 72 receives the sensor signal. The time stamp may be provided by a period of time indicating elapsed time period relative to a certain calculation time point in the microcomputer 711 or in the sensor apparatus 501. Alternatively, the time stamp may be provided by a period of time indicating elapsed time period relative to a certain date and time.

As shown in FIG. 7, suppose that a cycle shift occurs and this cycle shift causes the transmission cycle Ttr becomes longer than the calculation cycle Top. In this case, the received sensor value S(x−1) assigned with the counter value (X−1) is repeatedly used by twice in the differential calculation (DIFF). The differential calculator 75 calculates the respective time differential values Sd(x−1), Sd(x), and Sd(x+1) using the following formula 5.1, formula 5.2a, and formula 5.3. As described above, the time differential value is calculated by dividing a difference between the last and the present time sensor values by a time stamp difference.

$$Sd(x-1) = \frac{S(x-1)-S(x-2)}{t(x-1)-t(x-2)} \tag{5.1}$$

$$Sd(x) = \frac{S(x-1)-S(x-2)}{t(x-1)-t(x-2)} \tag{5.2a}$$

$$Sd(x+1) = \frac{S(x+1)-S(x)}{t(x+1)-t(x)} \tag{5.3}$$

In this method, the differential calculation always uses the last time sensor value and the present time sensor value. Thus, condition branch is not needed.

In an alternative calculation, instead of the above formula 5.2a, the following formula 5.2b may be used to calculate the time differential value Sd(x). This calculation is carried out similar to the above formula 3.2 which adopts the communication counter as the time information.

$$Sd(x) = Sd(x-1) \quad (5.2b)$$

As shown in FIG. 8, suppose that a cycle shift occurs and this cycle shift causes the transmission cycle Ttr becomes shorter than the calculation cycle Top. In this case, the third received sensor value S(x+1) assigned with the time stamp t(x+1) is skipped and is not used in the differential calculation. The differential calculator 75 calculates the respective time differential values Sd(x−1), Sd(x), and Sd(x+1) using the following formula 6.1, formula 6.2, and formula 6.3. As described above, the time differential value is calculated by dividing a difference between the last time and the present time sensor values by the time stamp difference.

$$Sd(x-1) = \frac{S(x-1) - S(x-2)}{t(x-1) - t(x-2)} \quad (6.1)$$

$$Sd(x) = \frac{S(x) - S(x-1)}{t(x) - t(x-1)} \quad (6.2)$$

$$Sd(x+1) = \frac{S(x+2) - S(x)}{t(x+2) - t(x)} \quad (6.3)$$

In this method, the differential calculation always uses the last time sensor value and the present time sensor value. Thus, condition branch is not needed.

In the second embodiment which adopts the time stamp as the time information, a condition branch may also be made corresponding to whether the time stamp is updated or not similar to the first embodiment. When the time stamp is not updated, the last time differential value Sd(x−1) can be used as the present time differential value Sd(x) using the above formula 3.2 similar to the first embodiment.

As described above, in the communication system 401 according to the second embodiment, the differential calculator 75 of the microcomputer 711 calculates the time differential value using the time information assigned separate from the sensor value. With this configuration, the shift between the transmission cycle and the calculation cycle can be determined with reference to the difference of the time information. Further, in a case where the cycle shift is occurred, the differential calculator 75 corrects the sensor value to be used in the differential calculation. Thus, the time differential value can be correctly calculated.

When the communication system 401 is applied to the electric power steering apparatus, the changing rate of the operation torque with respect to time can be correctly calculated. This enables an improved control to the motor 80 to correctly output the required assist torque. This improves a driver's steering experience of the steering operation.

(Third Embodiment)

Figure 9A:
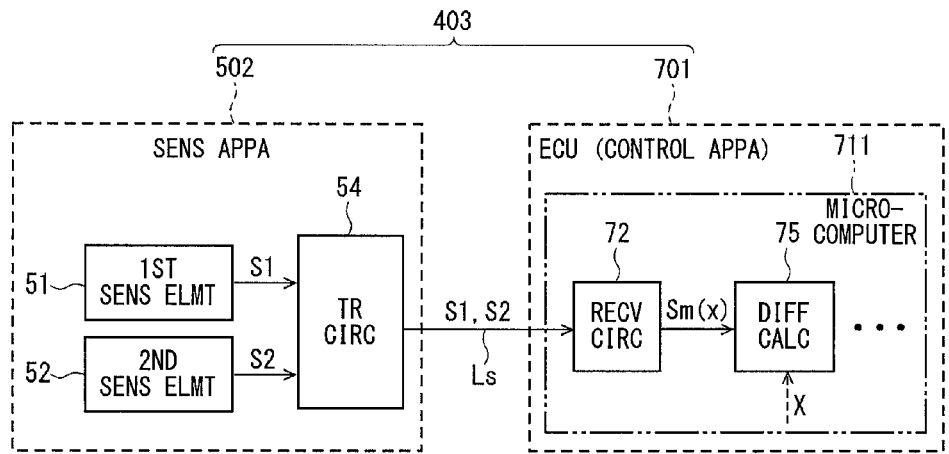
FIG. 9A is a block diagram showing a configuration of a communication system according to a third embodiment of the present disclosure.

The following will describe a communication system according to the third embodiment of the present disclosure with reference to FIG. 9A to FIG. 12B. As shown in FIG. 9A, the sensor apparatus 502 has multiple sensing elements 51, 52. The multiple sensing elements have substantially same specification and configuration, and detect the same physical quantity of the same detection target. That is, multiple sensing elements detect a common physical quantity of a common detection target. Specifically, the multiple sensing elements 51, 52 are disposed in redundant manner in order to secure the detection operation when one of the sensing elements 51, 52 has abnormality or malfunction. Herein, each sensing element 51, 52 detects a steering torque of the common magnetism collecting ring of the common torque sensor assembly 93.

In the configuration of the microcomputer 711 shown in FIG. 9A, the differential calculator 75 uses time information X assigned by one of the sensor apparatus 501 or the microcomputer 711 similar to the cases shown in FIG. 1A and FIG. 1B. The assist amount calculator 76 has a configuration similar to the first embodiment. Thus, detailed description will be omitted. The sensor value outputted from the reception circuit 72 to the differential calculator 75 is expressed as Sm(x). Herein, sensor value Sm(x) may indicates S1(x) corresponding to the sensing element 51, S2(x) corresponding to the sensing element 52, or an average value of S1(x) and S2(x). In the present embodiment, synchronization communication may be performed as shown in FIG. 1A and FIG. 1B using the synchronization signal Sync.

The communication system 403 shown in FIG. 9A includes one sensor apparatus 502 and an ECU 701 having a microcomputer 711. The sensor apparatus 502 includes two sensing elements 51, 52 and a transmission circuit 54. The sensing element 51 is also referred to as a first sensing element (1ST SENS ELMT), and the sensing element 52 is also referred to as a second sensing element (2ND SENS ELMT). The first sensing element 51 and the second sensing element 52, respectively, detect sensor values. The sensor value detected by the first sensing element 51 is referred to as a first sensor value S1, and the sensor value detected by the second sensing element 52 is referred to as a second sensor value S2. Further, the sensor signal including the first sensor value S1 is expressed as S1 using the same symbol S1, and the sensor signal including the second sensor value S2 is expressed as S2 using the same symbol S2. When the first sensor value S1 and the second sensor value S2 are detected at an identical time point, identical time information is assigned to the first sensor value S1 and the second sensor value S2. In the present embodiment, the first sensor signal S1 and the second sensor signal S2 are transmitted to the reception circuit 72 of the microcomputer 711 using a single signal line Ls.

(Fourth Embodiment)

Figure 9B:
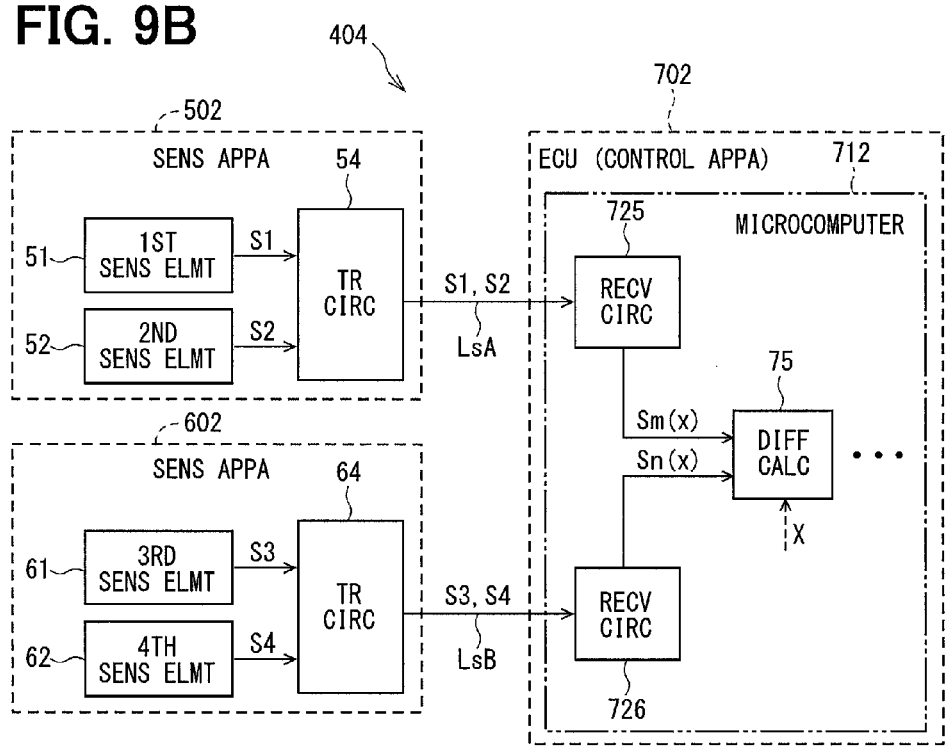
FIG. 9B is a block diagram showing a configuration of a communication system according to a fourth embodiment of the present disclosure.

A communication system 404 according to the fourth embodiment has a configuration similar to the communication system 403 according to the third embodiment. As shown in FIG. 9B, the communication system 404 according to the present embodiment includes multiple sensor apparatus 502, 602 having substantially identical configurations, and an ECU 702. The ECU 702 has a microcomputer 712.

The sensor apparatus 502 includes a first sensing element 51, a second sensing element 52, and a transmission circuit 54. The sensor apparatus 602 includes a third sensing element 61, a fourth sensing element 62, and a transmission circuit 64. Similar to the third embodiment, the first sensing element 51, the second sensing element 52, the third sensing element 61, and the fourth sensing element 62, respectively, detect sensor values of the same physical quantity of the same detection target. The sensor value detected by the first sensing element 51 is referred to as a first sensor value S1, the sensor value detected by the second sensing element 52 is referred to as a second sensor value S2, the sensor value detected by the third sensing element 61 is referred to as a third sensor value S3, and the sensor value detected by the fourth sensing element 62 is referred to as a fourth sensor value S4.

Further, the sensor signal including the first sensor value S1 is expressed as S1 using the same symbol S1, the sensor signal including the second sensor value S2 is expressed as S2 using the same symbol S2, the sensor signal including the third sensor value S3 is expressed as S3 using the same symbol S3, and the sensor signal including the fourth sensor value S4 is expressed as S4 using the same symbol S4. The sensor value outputted from a reception circuit 725 to the differential calculator 75 is expressed as Sm(x). Herein, sensor value Sm(x) may indicates S1(x) corresponding to the sensing element 51, S2(x) corresponding to the sensing element 52, or an average value of S1(x) and S2(x). Similarly, the sensor value outputted from a reception circuit 726 to the differential calculator 75 is expressed as Sn(x). Herein, sensor value Sn(x) may indicates S3(x) corresponding to the sensing element 61, S4(x) corresponding to the sensing element 62, or an average value of S3(x) and S4(x). The transmission circuits 54, 64 of the two sensor apparatus 502, 602 may communicate with each other using a communication line (not shown).

Each of the sensor apparatus 502, 602 is connected to the same microcomputer 712 through respective signal lines LsA, LsB. The first and second sensor signals S1 and S2 are transmitted to the reception circuit 725 of the microcomputer 712 through the signal line LsA. The third and fourth sensor signals S3 and S4 are transmitted to the reception circuit 726 of the microcomputer 712 through the signal line LsB. The reception circuits 725 and 726 may receive the first and second sensor signals S1 and S2 simultaneously with the third and fourth sensor signals S3 and S4. Alternatively, the reception circuits 725 and 726 may receive the first and second sensor signals S1 and S2 at a different time point from a reception time point of the third and fourth sensor signals S3 and S4.

FIG. 10 shows an exemplary combination of the time information and the sensor values provided by two sensing elements. In this example, the time information is provided by the communication counter described in the first embodiment. Alternatively, the time stamp described in the second embodiment may be used as the time information.

As show in FIG. 10, the time information N may be commonly assigned to the first sensor value S1(N) and the second sensor value S2(N) when the first sensor value S1(N) and the second sensor value S2(N) are detected at an identical time point.

Based on the above-described idea, the specific examples showing combinations of the time information and the sensor values in the communication systems 403 and 404 according to the third and fourth embodiments are shown in FIG. 11A to FIG. 11C.

In the example shown in FIG. 11A which corresponds to the communication system 403 of the third embodiment, identical time information k is assigned to the first sensor value S1(k) and the second sensor value S2(k). Herein, the first sensor value S1(k) and the second sensor value S2(k) are detected at an identical time point.

The differential calculator 75 may calculate the time differential value Sd using the sensor value S1(k), calculates the time differential value Sd using the sensor value S2(k), or calculates the time differential value Sd using an average value Savr(k) of the two sensor values S1(k) and S2(k). Herein, the first sensor value S1(k) and the second sensor value S2(k) are received at an identical time point.

By using the average value Savr(k) of the two sensor values S1(k) and S2(k), the variation in each sensing element can be averaged, and a calculation reliability can be improved. In the calculation of the average value, each sensor value may be weighted corresponding to the sensing element instead of a simple average calculation.

In the example shown in FIG. 11B which corresponds to the communication system 404 of the fourth embodiment, identical time information k1 is assigned to the first sensor value S1(k1) and the second sensor value S2(k1). Herein, the first sensor value S1(k1) and the second sensor value S2(k1) are detected at an identical time. Further, identical time information k2 is assigned to the third sensor value S3(k2) and the fourth sensor value S4(k2). Herein, the third sensor value S3(k2) and the fourth sensor value S4(k2) are detected at an identical time point, and the detection time point of the third and fourth sensor values S3(k2) and S4(k2) is different from the detection time point of the first and second sensor values S1(k1) and S2(K1).

The differential calculator 75 may calculate the time differential value Sd as the following. The differential calculator 75 calculates the average value Savr(k1) of the first sensor value S1(k1) and the second sensor value S2(k1) received at the same time, and calculates the average value Savr(k2) of the third sensor value S3(k2) and fourth sensor value S4(k2) received at the same time.

Then, the differential calculator 75 calculates an average value Savr(k1-2) of the average value Savr(k1) and the average value Savr(k2). After calculating the average value Savr(k1-2), the differential calculator 75 calculates the time differential value Sd using the average value Savr(k1-2).

As shown in FIG. 11C, communication system 404 according to the fourth embodiment may assign the identical time information to the sensor values S1(k), S2(k), S3(k), and S4(k). For example, the differential calculator 75 may use an average value Savr(k) of the four sensor values S1(k), S2(k), S3(k), and S4(k) received at the identical time point when calculating the time differential value Sd.

The following will describe an example in which the time differential value is calculated using the sensor values received at respectively different time points.

Figure 12A:
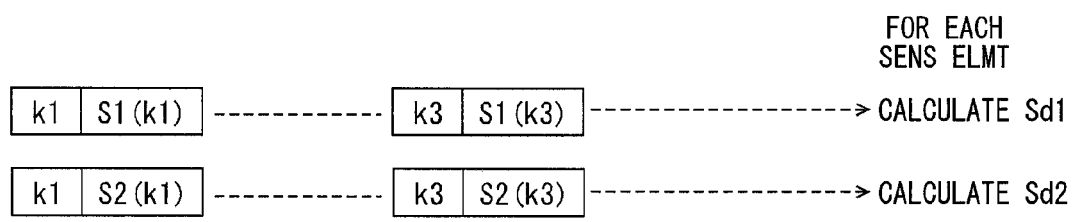
FIG. 12A is a diagram showing a differential value calculation using multiple sensor values received at different time points.

As shown in FIG. 12A, suppose that the sensor value S1(k1) is received at a different time point from the sensor value S1(k3) from the first sensing element 51 of the sensor apparatus 502. In this case, the differential calculator 75 calculates a difference between the two sensor values S1(k1) and S1(k3), and calculates the time differential value Sd1 of the first sensing element 51 based on the sensor value difference. Further, suppose that the sensor value S2(k1) is received at a different time point from the sensor value S2(k3) from the second sensing element 52 of the sensor apparatus 502. In this case, the differential calculator 75 calculates a difference between the two sensor values S2(k1) and S2(k3), and calculates the time differential value Sd2 of the second sensing element 52 based on the sensor value difference.

Figure 12B:
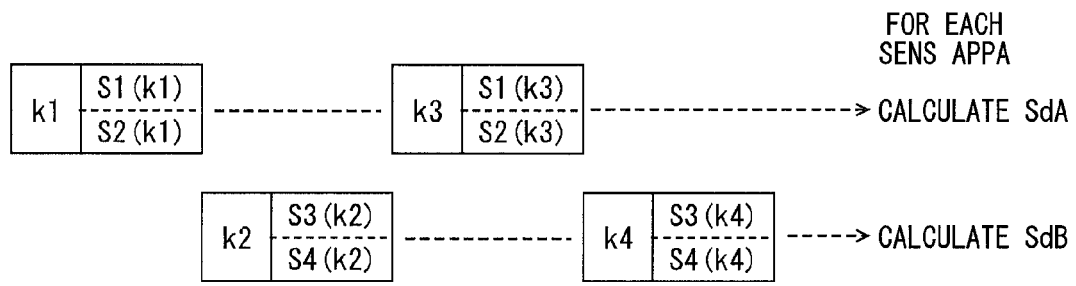
FIG. 12B is a diagram showing a differential value calculation using multiple sensor values received at different time points.

As shown in FIG. 12B, suppose that the sensor value group including S1(k1) and S2(k1) is received at a different time point from the sensor value group including S1(k3) and S2(k3) from the first and second sensing elements 51 and 52 of the first sensor apparatus 502. In this case, the differential calculator 75 calculates a difference between the two sensor value groups, and calculates the time differential value SdA of the first sensor apparatus 502 based on the sensor value difference between the two sensor value groups. Further, suppose that the sensor value group including S3(k2) and S4(k2) is received at a different time point from the sensor value group including S3(k4) and S4(k4) from the third and fourth sensing elements 61 and 62 of the second sensor apparatus 602. In this case, the differential calculator 75 calculates a difference between the two sensor value groups, and calculates the time differential value SdB of the second sensor apparatus 602 based on the sensor value difference between the two sensor value groups.

As described above, the time differential value Sd may be calculated corresponding to each sensing element as shown in FIG. 12A or corresponding to each sensor apparatus as shown in FIG. 12B. This configuration enables a reliable determination of abnormality occurrence in one of the sensing elements or in one of the sensing apparatus. Further, the sensor signal outputted from the sensing element or the sensing apparatus which is determined to have the abnormality is avoided to be used in the differential calculation. That is, only the sensor signals outputted from the normal sensing element or the normal sensor apparatus are used in the differential calculation. Thus, the calculation accuracy can be improved.

As described above, the communication system according to the third and fourth embodiments includes multiple sensing elements each of which detects the same physical quantity of the same detection target. The differential calculator 75 calculates the time differential value using the time information assigned separate from the multiple sensor values S1 to S4. Thus, when the transmission cycle of each sensor apparatus 502, 602 is shifted from the calculation cycle of corresponding microcomputer 711, 712, the sensor value used in the differential calculation is corrected based on the time information. Accordingly, the time differential values of the sensor values S1 to S4 can be correctly calculated.

(Other Embodiments)

In the third and fourth embodiments, a single sensor apparatus may have three or more sensing elements instead of two sensing elements. In the fourth embodiment, the communication system 404 may have three or more sensor apparatus instead of two sensor apparatus. Accordingly, a configuration for calculating an average value of the multiple sensor values may be properly added or changed under the ideas described in the third and fourth embodiments.

In the foregoing embodiments, the digital communication protocol of the communication system adopts SENT protocol. Alternatively, other communication protocols may be used in the communication system. For example, as the sensor signal, eight bit octet signal may be used instead of the four bit nibble signal.

In the foregoing embodiments, the sensing element adopts the hall element. Alternatively, other elements that can detect the magnetic field may be used as the sensing element. Further, an element detecting a varying physical quantity other than the magnetic field can be used as the sensing element. The physical quantity detected by the sensing element is not limited to the torque. The sensing element may detect physical quantities, such as a rotational angle, a stroke, a load, a pressure or the like.

The communication system according to the foregoing embodiments is applied to the electric power steering apparatus. Alternatively, the communication system according to the present disclosure may be applied to a different apparatus that requires the microcomputer to perform a control calculation based on the detected sensor signal value.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A communication system comprising:
at least one sensor apparatus including at least one sensing element and a transmission circuit, wherein the at least one sensing element detects a sensor value indicating a physical quantity of a detection target, and the transmission circuit transmits, as a digital signal, a sensor signal including information indicative of the sensor value at a predetermined transmission cycle; and a microcomputer including a reception circuit and a differential calculator, wherein the reception circuit receives the sensor signal transmitted from the transmission circuit of the at least one sensor apparatus through a signal line and updates the sensor value received at last time with the sensor value received at present time, and the differential calculator calculates, at a predetermined calculation cycle, a time differential value by performing a time differential calculation to the sensor value that is updated using time information provided separate from the sensor value.

2. The communication system according to claim 1, wherein
the microcomputer transmits, to the at least one sensor apparatus, a synchronization signal which is synchronized with the predetermined calculation cycle of the differential calculator, and
the transmission circuit of the at least one sensor apparatus transmits the sensor signal at a time point in response to the synchronization signal.

3. The communication system according to claim 1, wherein,
when the transmission circuit of the at least one sensor apparatus transmits the sensor signal to the microcomputer, the transmission circuit assigns the time information separate from the sensor value.

4. The communication system according to claim 3, wherein
the transmission circuit includes a transmission time stamp in the sensor signal as the time information and transmits the time information to the microcomputer, and
the differential calculator calculates the time differential value by dividing a difference of the sensor value received at last time and the sensor value received at present time by a difference of the transmission time stamp transmitted together with the sensor value received at last time and the transmission time stamp transmitted together with the sensor value received at the present time.

5. The communication system according to claim 3, wherein,
when the differential calculator calculates a present time differential value before an update of the time information used in a calculation of a last time differential value, the differential calculator sets the present time differential value equal to the last time differential value.

6. The communication system according to claim 1, wherein,
when the reception circuit of the microcomputer receives the sensor signal transmitted from the at least one sensor apparatus, the reception circuit of the microcomputer assigns an update time point of the sensor value as the time information.

7. The communication system according to claim 6, wherein
the reception circuit assigns a reception time stamp to the sensor value as the time information when receiving the sensor value included in the sensor signal, and
the differential calculator calculates the time differential value by dividing a difference of the sensor value received at last time and the sensor value received at present time by a difference of the reception time stamp assigned to the sensor value received at last time and the reception time stamp assigned to the sensor value received at present time.

8. The communication system according to claim 1, wherein
the at least one sensor apparatus includes a plurality of sensing elements including the at least one sensing element, and each of the plurality of sensing elements detects the physical quantity of the detection target in common.

9. The communication system according to claim 8, wherein
the at least one sensor apparatus transmits, through the signal line in common, sensor signals respectively including information indicating respective sensor values detected by the plurality of sensing elements.

10. The communication system according to claim 8, wherein
the plurality of sensing elements, respectively, detect sensor values at an identical time point and the sensor values detected at the identical time point are assigned with identical time information.

11. The communication system according to claim 8, wherein
the differential calculator calculates the time differential value using an average value of sensor values received at an identical time point from the plurality of sensing elements.

12. The communication system according to claim 8, wherein
the differential calculator calculates the time differential value using an average value of sensor values received at different time points from the plurality of sensing elements.

13. The communication system according to claim 8, wherein
the at least one sensor apparatus includes a plurality of sensor apparatus, and
the differential calculator calculates the time differential value using a difference value of sensor values received at different time points corresponding to each of the plurality of sensing elements or corresponding to each of the plurality of sensor apparatus.

14. The communication system according to claim 1, wherein
the sensor signal adopts a nibble signal defined under SAE-J2716 which is a standard established by Society of Automotive Engineers International.

15. The communication system according to claim 1, wherein
the communication system is applied to an electric power steering apparatus equipped to a vehicle,
the at least one sensor apparatus detects a steering torque applied by a driver of the vehicle, and
the microcomputer calculates an assist torque amount required to be outputted by a motor based on the steering torque detected by the sensor apparatus.

* * * * *